United States Patent
Abidi et al.

(10) Patent No.: US 10,547,200 B2
(45) Date of Patent: Jan. 28, 2020

(54) NEAR-FIELD WIRELESS POWER TRANSFER SYSTEM WITH IMMUNITY TO DISTANCE AND/OR LOAD VARIATIONS

(71) Applicant: The Regents of the University of California, Oakland, CA (US)

(72) Inventors: Asad A. Abidi, Los Angeles, CA (US); Jiacheng Pan, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 15 days.

(21) Appl. No.: 15/612,893

(22) Filed: Jun. 2, 2017

(65) Prior Publication Data

US 2017/0353048 A1    Dec. 7, 2017

Related U.S. Application Data

(60) Provisional application No. 62/344,827, filed on Jun. 2, 2016, provisional application No. 62/453,029, filed on Feb. 1, 2017.

(51) Int. Cl.
| | | |
|---|---|---|
| *H02J 7/04* | (2006.01) | |
| *H02J 7/02* | (2016.01) | |
| *H02J 50/12* | (2016.01) | |

(52) U.S. Cl.
CPC .............. *H02J 7/045* (2013.01); *H02J 7/025* (2013.01); *H02J 50/12* (2016.02)

(58) Field of Classification Search
CPC ....................................................... H02J 7/025
(Continued)

(56) References Cited

U.S. PATENT DOCUMENTS

| | | | |
|---|---|---|---|
| 1,119,732 A | 12/1914 | Tesla | |
| 2010/0036773 A1* | 2/2010 | Bennett | G06Q 20/3674 705/67 |

(Continued)

FOREIGN PATENT DOCUMENTS

WO    2019036519 A1    2/2019

OTHER PUBLICATIONS

International Search Report and Written Opinion for International Application No. PCT/US2018/046779, Search completed Oct. 11, 2018, dated Oct. 26, 2018, 11 Pgs.

(Continued)

*Primary Examiner* — Edward Tso
*Assistant Examiner* — Ahmed H Omar
(74) *Attorney, Agent, or Firm* — KPPB LLP (57) ABSTRACT

Wireless power transfer systems in accordance with embodiments of the invention are disclosed. In one embodiment, a wireless power transfer system includes a power transmitter driven by an oscillator, a power receiver including a resistive load, and a coupled resonator link configured to deliver power from a transmitter tank circuit to a receiver tank circuit, wherein the free-running oscillator automatically tunes to oscillate at a frequency that does not experience a phase shift due to the impedance of the transmit side of the coupled resonator link, wherein the power transmitter provides regulated voltage across a range of distances between the transmitter tank circuit and the receiver tank circuit, and wherein the power transmitter regulates voltage across a range of resistive loads of the power receiver.

6 Claims, 10 Drawing Sheets

(58) Field of Classification Search
USPC .......................................................... 320/108
See application file for complete search history.

(56) References Cited

U.S. PATENT DOCUMENTS

| | | |
|---|---|---|
| 2010/0164458 A1 | 7/2010 | Pollard |
| 2014/0273835 A1 | 9/2014 | Ghovanloo et al. |
| 2016/0036244 A1 | 2/2016 | Griffith |
| 2017/0118543 A1 | 4/2017 | Ha et al. |
| 2017/0155194 A1* | 6/2017 | Kanno ..................... G06K 7/10 |

OTHER PUBLICATIONS

Ahn et al., "Wireless Power Transmission With Self-Regulated Output Voltage for Biomedical Implant", IEEE Transactions on Industrial Electronics, vol. 61, Issue 5, May 2014, pp. 2225-2235.
Baker et al., "Feedback Analysis and Design of RF Power Links for Low-Power Bionic Systems", IEEE Transactions on Biomedical Circuits and Systems, vol. 1, No. 1, Mar. 2007, pp. 28-38.
Barkhausen et al., "Lehrbuch der Elektronenröhren und ihrer technischen Anwendungen", S. Hirzel Verlag Leipzig, 1964, no. v. 2, 194 pgs. (presented in two parts).
Cannon et al., "Magnetic Resonant Coupling As a Potential Means for Wireless Power Transfer to Multiple Small Receivers", IEEE Transactions on Power Electronics, vol. 24, No. 7, Jul. 2009, pp. 1819-1825.
Cheng et al., "A 6.78MHz 6W Wireless Power Receiver with a 3-Level 1x/1/2x/0x Reconfigurable Resonant Regulating Rectifier", 2016 IEEE International Solid-State Circuits Conference, Session 21, Harvesting and Wireless Power, 21.7, Feb. 3, 2016, pp. 376-378.
Covic et al., "Inductive Power Transfer", Proceedings of the IEEE, vol. 101, No. 6, Jun. 2013, pp. 1276-1289.
Ghovanloo et al., "A wideband frequency-shift keying wireless link for inductively powered biomedical implants", IEEE Transactions on Circuits and Systems I: Regular Papers, vol. 51, Issue 12, Dec. 2004, pp. 2374-2383.
Hegazi et al., "A Filtering Technique to Lower LC Oscillator Phase Noise", IEEE Journal of Solid-State Circuits, vol. 36, Issue 12, Dec. 2001, pp. 1921-1930.
Hui, "Planar Wireless Charging Technology for Portable Electronic Products and Qi", Proceedings of the IEEE, vol. 101, No. 6, Jun. 2013, pp. 1290-1301.
Jow et al., "Design and Optimization of Printed Spiral Coils for Efficient Transcutaneous Inductive Power Transmission", IEEE Transactions on Biomedical Circuits and Systems, vol. 1, No. 3, Sep. 2007, pp. 193-202.
Kiani et al., "A Power-Management ASIC with Q-Modulation Capability for Efficient Inductive Power Transmission", 2015 IEEE International Solid-State Circuits Conference, Session 12, Inductor-Based Power Conversion, 12.7, Feb. 24, 2015, pp. 226-228.
Kurs et al., "Wireless Power Transfer via Strongly Coupled Magnetic Resonances", Science, vol. 317, No. 5834, Jul. 6, 2007, pp. 83-86.
Li et al., "Wireless Power Transfer System Using Primary Equalizer for Coupling- and Load-Range Extension in Bio-Implant Applications", 2015 IEEE International Solid-State Circuits Conference, Session 12, Inductor-Based Power Conversion, 12.8, pp. 228-230.
Mandal et al., "Power-Efficient Impedance-Modulation Wireless Data Links for Biomedical Implants", IEEE Transactions on Biomedical Circuits and Systems, vol. 2, Issue 4, Dec. 2008, pp. 301-315.
Middlebrook, "Low-Entropy Expressions: The Key to Design-Oriented Analysis", Proceedings of the 21st Frontiers in Education Conference, Engineering Education in a New World Order, West Lafayette, Indiana, Sep. 21-24, 1991, pp. 399-403.
Middlebrook, "Null Double Injection and the Extra Element Theorem", IEEE Transactions on Education, vol. 32, No. 3, Aug. 1989, pp. 167-180.

Middlebrook, "The General Feedback Theorem: A Final Solution for Feedback Systems", IEEE Microwave Magazine, vol. 7, No. 2, Apr. 2006, pp. 50-63.
Miura et al., "Analysis and Design of Inductive Coupling and Transceiver Circuit for Inductive Inter-Chip Wireless Superconnect", IEEE Journal of Solid-State Circuits, vol. 40, Issue 4, Apr. 2005, pp. 829-837.
Muller et al., "A Minimally Invasive 64-Channel Wireless μECoG Impalnt", IEEE Journal of Solid-State Circuits, Jan. 2015, vol. 50, No. 1, pp. 344-359.
Popovic et al., "Low-Power Far-Field Wireless Powering for Wireless Sensors", Proceedings of the IEEE, vol. 101, No. 6, Jun. 2013, pp. 1397-1409.
Sample et al., "Analysis, Experimental Results, and Range Adaptation of Magnetically Coupled Resonators for Wireless Power Transfer", IEEE Transactions on Industrial Electronics, vol. 58, No. 2, Feb. 2011, pp. 544-554.
Shinohara, "Beam Control Technologies Wth a High-Efficiency Phased Array for Microwave Power Transmission in Japan", Proceedings of the IEEE, vol. 101, No. 6, Jun. 2013, pp. 1448-1463.
Si et al., "A Frequency Control Method for Regulating Wireless Power to Implantable Devices", IEEE Transactions on Biomedical Circuits and Systems, vol. 2, No. 1, Mar. 2008, pp. 22-29.
Terman, "Radio Engineers' Handbook", McGraw-Hill Book Company, Inc., First Edition, Tenth Impression, 1943, 1036 pgs. (presented in 8 parts).
Tesla, "The True Wireless", Electrical Experimenter, May 1919, 7 pgs.
Yilmaz et al., "Wireless Energy and Data Transfer for In-Vivo Epileptic Focus Localization", IEEE Sensors Journal, vol. 13, No. 11, Nov. 2013.
Zierhofer et al., "High-Efficiency Coupling-Insensitive Transcutaneous Power and Data Transmission Via an Inductive Link", IEEE Transactions on Biomedical Engineering, vol. 37, No. 7, Jul. 1990, pp. 716-722.
Ahn et al., "Wireless Power Transfer Resonance Coupling Amplification by Load-Modulation Switching Controller", IEEE Transactions on Industrial Electronics, vol. 62, No. 2, Feb. 2015, pp. 898-909.
Cheon et al., "Circuit-Model-Based Analysis of a Wireless Energy-Transfer System via Coupled Magnetic Resonances", IEEE Transactions on Industrial Electronics, vol. 58, No. 7, Jul. 2011, pp. 2906-2914.
Cohn, "Direct-Coupled-Resonator Filters", Proceedings of the IRE, vol. 45, No. 2, Feb. 1957, pp. 187-196.
Galbraith et al., "A Wide-Band Efficient Inductive Transdennal Power and Data Link with Coupling Insensitive Gain", IEEE Transactions on Biomedical Engineering, vol. BME-34, No. 4, Apr. 1987, pp. 265-275.
Greenhouse, "Design of Planar Rectangular Microelectronic Inductors", IEEE Transactions on Parts, Hybrids, and Packaging, vol. 10, No. 2, Jun. 1974, pp. 101-109.
Ha et al., "Energy Recycling Telemetry IC With Simultaneous 11.5 mW Power and 6.78 Mb/s Backward Data Delivery Over a Single 13.56 MHz Inductive Link", IEEE Journal of Solid-State Circuits, vol. 51, Issue 11, Nov. 2016, pp. 2664-2678.
Huang et al., "A Wireless Power Transfer System with Enhanced Response and Efficiency by Fully-Integrated Fast-Tracking Wireless Constant-Idle-Time Control for Implants", Symposium on VLSI Circuits Digest of Technical Papers, Honolulu, Hawaii, Jun. 15-17, 2016, 2 pgs.
Inanlou, et al., "A 10.2 Mbps Pulse Harmonic Modulation Based Transceiver for Implantable Medical Devices", IEEE Journal of Solid-State Circuits, vol. 46, Issue 6, Jun. 2011, pp. 1296-1306.
Inanlou, et al., "Wideband Near-Field Data Transmission Using Pulse Harmonic Modulation", IEEE Transactions on Circuits and Systems I: Regular Papers, vol. 58, Issue 1, Jan. 2011, pp. 186-195.
Kiani et al., "12.7 A power-management ASIC with Q-modulation capability for efficient inductive power transmission", Transactions of the IEEE International Solid-State Circuits Conference—(ISSCC) Digest of Technical Papers, San Francisco, California, Feb. 22-26, 2015, 3 pgs.

(56) References Cited

OTHER PUBLICATIONS

Kiani et al., "A 13.56-Mbps Pulse Delay Modulation Based Transceiver for Simultaneous Near-Field Data and Power Transmission", IEEE Transactions on Biomedical Circuits and Systems, vol. 9, Issue 1, Feb. 2015, pp. 1-11.

Kiani et al., "Design and Optimization of a 3-Coil Inductive Link for Efficient Wireless Power Transmission", IEEE Transactions on Biomedical Circuits and Systems, vol. 5, No. 6, Dec. 2011, pp. 579-591.

Lee et al., "Impedance-Matched Wireless Power Transfer Systems Using an Arbitrary No. Of Coils With Flexible Coil Positioning", IEEE Antennas and Wireless Propagation Letters, vol. 13, Jun. 18, 2014, pp. 1207-1210.

Li et al., "Wireless Power Transfer System Using Primary Equalizer for Coupling- and Load-Range Extension in Bio-Implant Applications", IEEE International Solid-State Circuits Conference—(ISSCC) Digest of Technical Papers, San Francisco, California, Feb. 22-26, 2015, 3 pgs.

Lim et al., "An Adaptive Impedance-Matching Network Based on a Novel Capacitor Matrix for Wireless Power Transfer", IEEE Transactions on Power Electronics, vol. 29, No. 8, Aug. 2014, pp. 4403-4413.

Lin et al., "An Inductive Power and Data Telemetry Subsystem Wth Fast Transient Low Dropout Regulator for Biomedical Implants", IEEE Transactions on Biomedical Circuits and Systems, vol. 10, Issue 2, Apr. 2016, pp. 435-444.

Lo et al., "A 176-Channel 0.5cm3 0.7g Wireless Implant for Motor Function Recovery after Spinal Cord Injury", IEEE International Solid-State Circuits Conference (ISSCC), San Francisco, California, Jan. 31-Feb. 4, 2016, 3 pgs.

Martin et al., "Input Admittance Characteristics of a Tuned Coupled Circuit", Proceedings of the IRE, vol. 40, No. 1, Jan. 1952, pp. 57-61.

Mirzaei et al., "The Quadrature LC Oscillator: A Complete Portrait Based on Injection Locking", JSSC, 2007, vol. 42, No. 9, pp. 1916-1932.

Miura et al., "A 1Tb/s 3W inductive-coupling transceiver for inter-chip clock and data link", 2006 IEEE International Solid State Circuits Conference—Digest of Technical Papers, Feb. 6-9, 2006, San Francisco, CA, USA, pp. 1676-1685.

Ramrakhyani et al., "Design and Optimization of Resonance-Based Efficient Wireless Power Delivery Systems for Biomedical Implants", IEEE Transactions on Biomedical Circuits and Systems, vol. 5, No. 1, Feb. 2011, pp. 48-63.

Wang et al., "Design and analysis of an adaptive transcutaneous power telemetry for biomedical implants", IEEE Transactions on Circuits and Systems I: Regular Papers, vol. 52, No. 10, Oct. 2005, pp. 2109-2117.

Yang et al., "Inductor Modeling in Wireless Links for Implantable Electronics", IEEE Transactions on Magnetics, vol. 43, No. 10, Oct. 2007, pp. 3851-3860.

Yousefi et al., "A Distance-Immune Low-Power 4-Mbps Inductively-Coupled Bidirectional Data Link", Symposium on VLSI Circuits, Kyoto, Japan, Jun. 5-8, 2017, pp. C60-C61.

Zierhofer et al., "The class-E concept for efficient wide-band coupling-insensitive transdermal power and data transfer", Proceedings of the 14th Annual International Conference of the IEEE Engineering in Medicine and Biology Society, Paris, France, Oct. 29-Nov. 1, 1992, 2 pgs.

\* cited by examiner

NEAR-FIELD WIRELESS POWER TRANSFER SYSTEM WITH IMMUNITY TO DISTANCE AND/OR LOAD VARIATIONS

CROSS-REFERENCE TO RELATED APPLICATIONS

The instant application claims priority to U.S. Provisional Patent Applications Nos. 62/344,827, filed Jun. 2, 2016, and 62/453,029, filed Feb. 1, 2017, the disclosures of which are hereby incorporated by reference in their entirety.

STATEMENT REGARDING FEDERALLY SPONSORED RESEARCH

This invention was made with Government support under N66001-14-2-4029, awarded by the U.S. Government, Defense Advanced Research Projects Agency. The Government has certain rights in this invention.

FIELD OF THE INVENTION

The present invention relates to power links and more specifically to wireless power links.

BACKGROUND

Biomedical implants are often powered by an external source via an inductively-coupled wireless power link. During actual use the distance between the external battery and implant may change, their axes may misalign, and the load current may change significantly in implants that alternate between monitoring and stimulation.

SUMMARY OF THE INVENTION

Wireless power transfer systems in accordance with embodiments of the invention are disclosed. In one embodiment, a wireless power transfer system includes a power transmitter driven by an oscillator, a power receiver including a resistive load, and a coupled resonator link configured to deliver power from a transmitter tank circuit to a receiver tank circuit, wherein the free-running oscillator automatically tunes to oscillate at a frequency that does not experience a phase shift due to the impedance of the transmit side of the coupled resonator link, wherein the power transmitter provides regulated voltage across a range of distances between the transmitter tank circuit and the receiver tank circuit, and wherein the power transmitter regulates voltage across a range of resistive loads of the power receiver.

In another embodiment of the invention, the quality factor for the transmitter LC tank circuit exceeds the quality factor for the receiver LC tank circuit.

In an additional embodiment of the invention, the oscillator driver is configured to minimize energy loss in the transmitter tank circuit.

In yet another additional embodiment of the invention, the oscillator driver is configured with a tail current source that blocks a discharging path.

In still another additional embodiment of the invention, the tail current source includes a transistor having a drain voltage that is maintained above a threshold voltage during operation.

In yet still another additional embodiment of the invention, the transistor at the tail current source remains in a saturation region of the transistor.

In yet another embodiment of the invention, the tail current source is controlled by a feedback loop that maintains the oscillation amplitude at a reference level over a range of resistive loads.

In still another embodiment of the invention, the wireless power transfer regulates load voltage across a range of coil separations.

In yet still another embodiment of the invention, the wireless power transfer system regulates the load voltage across a range of resistive loads.

DETAILED DESCRIPTION

Turning now to the drawings, wireless power transfer systems in accordance with embodiments of the invention are disclosed. In many embodiments, the wireless power transfer systems include an oscillator driver followed by a parallel-LC coupled resonator link, delivering power to a resistive load. In this configuration, the wireless power transfer system can achieve highly-efficient stable power delivery using coupled resonators, which utilize an implicit feedback mechanism to automatically tune the system to a frequency that delivers stable power supply despite variations in distance and/or alignment of the coupled resonators. In this configuration, the oscillator will oscillate at the frequency in which the parallel-LC coupled resonator link presents zero impedance, which coincides with a frequency at which the parallel-LC coupled resonator link is able to deliver stable power with changes in distance and alignment. As such, the oscillator driver automatically tunes to a frequency that delivers stable power. In several embodiments, the quality factor of the transmitter is sufficiently large so as to reduce fluctuations in transmitted power and preserve total system efficiency. In many embodiments, adaptive loop control can be utilized within the transmitter to regulate the amplitude at the transmitter to further regulate the stability of delivered power. In several embodiments, the quality of the receiver is determined based upon the distances over which the wireless power system is designed to operate.

Prior art inductive link-based wireless power transfer systems generally include a power transmitter, where all the power originates, followed by a power transfer link through which power could flow from source to load. A power receiver harvests power from the link and delivers it to the load. However, these prior art power transfer systems can suffer when the power transmitter and power receiver are not aligned and/or when the power transmitter and power receiver are spaced at varying distances. Although some systems achieve stable power delivery by sensing the voltage at the load side using the power receiver and sending the information back to the power transmitter side so that driving strength can be adjusted to stabilize the power delivered to the load, such a design adds to the complexity of the system by introducing additional data transfer links and micro-controllers that consume extra power. Also, such solutions can mechanically control the power to the load, the power transfer efficiency may likely end up being very low. Moreover, usually in biomedical applications, the power receiver is part of an implanted device where the additional circuits can reduce the effectiveness of the implanted device. Other prior art power transfer systems attempt to solve these issues by modifying the power transmitter. One such design includes a feedback loop in the power transmitter by introducing an extra inductor to sense the frequency at the power transmitter. This inductor is coupled with another inductor at the power amplifier driver side so that the driving frequency can be tuned. However, extra inductors typically add to the loss of the system and can create problems with mismatched resonant frequencies, degrading the efficiency of the power transfer system. Another prior art design includes introducing circuitry to the power transmitter to adaptively control the operating frequency. However, the additional digital blocks needed to implement the adaptive control algorithms consume power, lead to energy loss, and may not react to the changes in the operating environment due to the response time needed by the digital control blocks. A third prior art design includes introducing additional coils placed in between the power transmitter and power receiver, where the intermediate coils can move freely to help tune the system to deliver stable power over distance variations. This multi-coil method, however, lacks practicability in that real-life applications often do not allow freely-moving extra coils and the additional coils present a variety of challenges with respect to increased cost and complexity along with decreased efficiency.

Wireless power transfer systems in accordance with many embodiments of the invention deliver a stable voltage to a load device (such as a biomedical implant) with a high power transfer efficiency without the use of voltage limiters or alignment magnets. Power transmitters utilized in wireless power transfer systems can self-tune to a frequency of stable power delivery so that the fluctuations in the power delivered can be minimized and the wireless power transfer system can operate at a high efficiency. In a variety of embodiments, a low-power adaptive loop control is incorporated into the power transmitter to regulate the amplitude at the transmitter side to provide stable power delivery under receiver load variations. Additionally, power transmitters and receivers in wireless power transfer systems in accordance with various embodiments of the invention can dynamically adapt the resonant frequency of the wireless power link so that the quality (Q) factor of the power transmitter and/or power receiver can be maximized (i.e. kept above a threshold value) at a particular coupling coefficient, thereby resulting in a longer operating range as the coupling coefficient decreases and maintaining the efficiency of the power transmitter.

A variety of wireless power transfer systems, including exemplary circuits for both the power transmitters and power receivers, in accordance with a variety of embodiments of the invention are described in more detail below.

Wireless Power Transfer Circuits (with Parallel Coupled Resonators)

Figure 1:
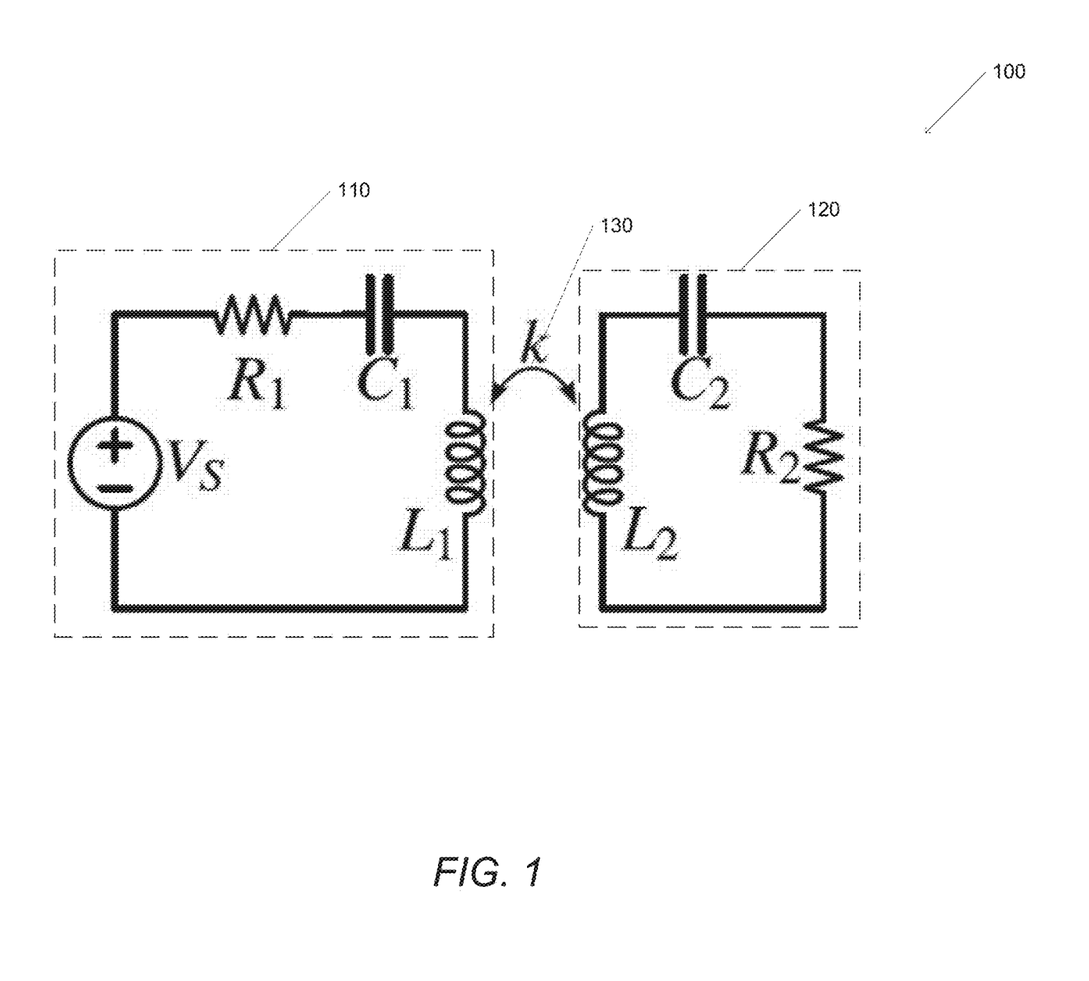
FIG. 1 is a conceptual illustration of a wireless power transfer circuit in accordance with an embodiment of the invention.

Turning now to FIG. 1, wireless power transfer circuits in accordance with an embodiment of the invention are shown. The wireless power transfer system 100 includes a power transmitter 110 and a power receiver 120 capable of being electrically or magnetically coupled via a wireless power transfer link 130. The power transmitter 110 includes a sinusoidal voltage source $V_S$ electrically coupled to a resistor $R_1$, capacitor $C_1$, and inductor $L_1$ in series. The power receiver 120 includes a resistor $R_2$, capacitor $C_2$, and inductor $L_2$ electrically coupled in series. In a number of embodiments, the power transmitter 110 and power receiver 120 resonate at the same frequency, $\omega_{res}=1/\sqrt{L_1C_1}=1/\sqrt{L_2C_2}$, although their quality factors $Q_1$, $Q_2$ may vary, where $Q_1$ is the quality factor for power transmitter 110 and $Q_2$ is the quality factor for power receiver 120. At this resonant frequency, the impedance in each of power transmitter 110 and power receiver 120 is purely resistive. When the two inductors $L_1$ and $L_2$ couple over wireless power transfer link 130 with a coefficient k ($k_C$<k<1, $k_C$ defined below), the driving point impedance across the voltage source $V_S$ is resistive, that is, $-\text{Im}\{Z_T\}=\text{Im}\{Z_1\}$ at three frequencies: $\omega_{res}$, bracketed by two other frequencies, $\omega_L$ and $\omega_H$ that depend on k and are defined below by equation (1) whose roots are the intersection points of the impedance resonance curve of the power receiver 120 with its own inverse, offset from each other by $1/k^2$. In several embodiments, as k increases, $\omega_L$ and $\omega_H$ will be split farther apart. In a variety of embodiments, at frequencies $\omega_L$ and $\omega_H$, the driving point impedance across $V_S$ is a constant resistance for all k>$k_C$ and $k_C=1/Q_2$.

Figure 2:
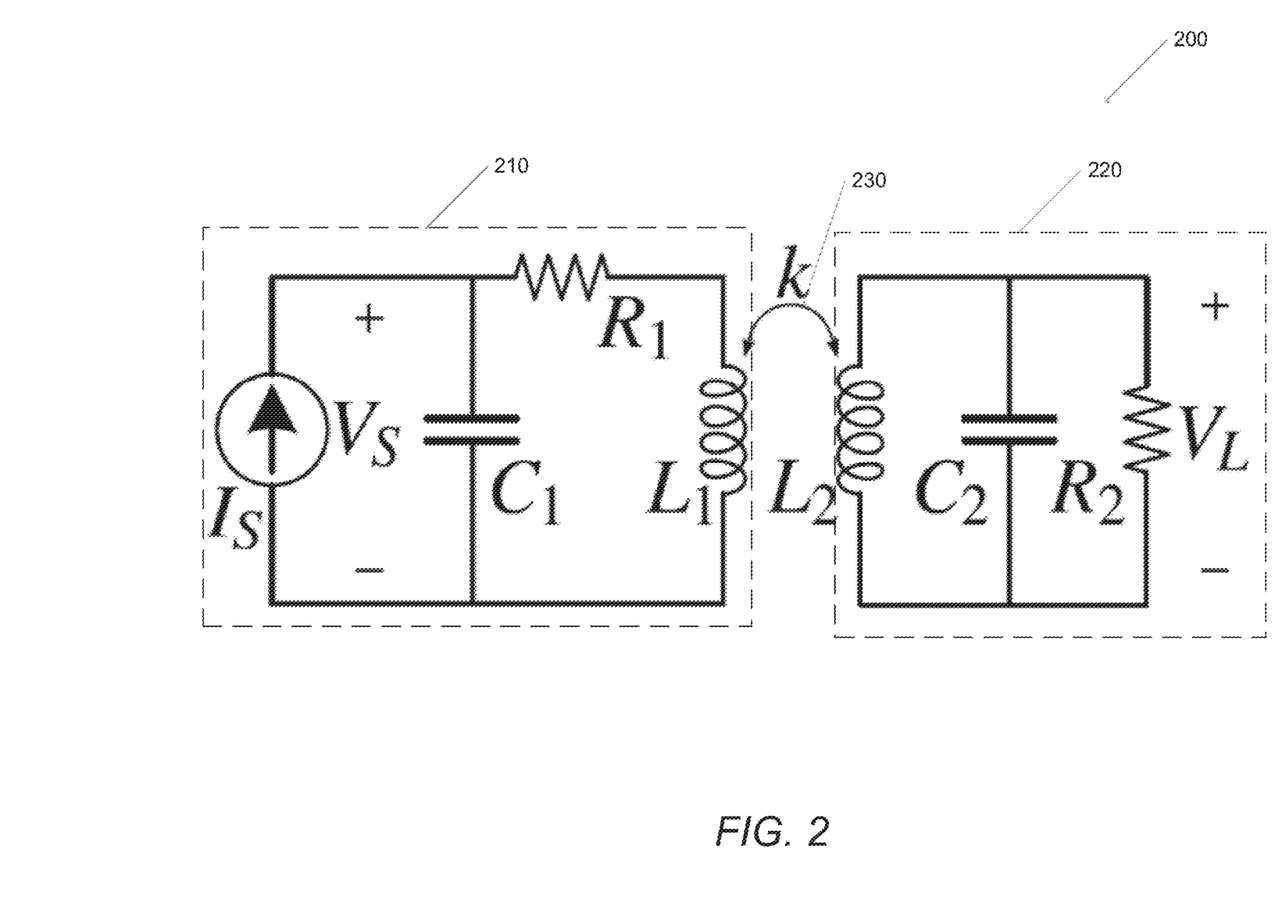
FIG. 2 is a conceptual illustration of a wireless power transfer circuit with parallel coupled resonators in accordance with an embodiment of the invention.

Turning now to FIG. 2, wireless power transfer circuits including shunt branches in accordance with an embodiment of the invention is shown. The wireless power transfer system 200 includes a power transmitter 210 and a power receiver 220 capable of being electrically or magnetically coupled via a wireless power transfer link 230. The power transmitter 210 includes a sinusoidal current source $I_S$ electrically coupled to the series combination of a resistor $R_1$ and inductor $L_1$ in parallel, while capacitor $C_1$ is electrically coupled in parallel. The power receiver 220 includes a resistor $R_2$, capacitor $C_2$, and inductor $L_2$ electrically coupled in parallel. Power transmitter 210 and power receiver 220 have quality factors $Q_1$ and $Q_2$ as described above with respect to FIG. 1. If $Q_1$, $Q_2$>>1 then the operation of the wireless power transfer system 200 is consistent with the operation of the wireless power transfer system 100 described above. At the frequencies $\omega_L$ and $\omega_H$ and to the first order, the power transmitter 220 will deliver power $P_2$ to the load device (such as a biomedical implant) modeled by the resistor load $R_2$ in power receiver 220 with a power transfer efficiency $\eta$ defined as the ratio of power into the load $R_2$ of the power receiver to the power out of the power transmitter energy source $V_s$:

$$P_2(\omega_L, \omega_H) = \frac{|V_S|^2}{2R_1Q_1^2}\left(\frac{Q_1}{Q_2} + \frac{\pm k}{1 \pm k}\right); \tag{1}$$

$$\eta = \frac{Q_1}{Q_1 + Q_2}$$

Here, η accounts for loss in the transmitter coil resistance $R_1$ for now, when it is assumed that, on the power receiver side, the load $R_2$ dissipates essentially all the power. In a number of embodiments, other factors such as loss in the receiver coil, loss in driver power conversion, etc. are included. The two signs of k in the expression for $P_2$ are associated with $\omega_L$ and $\omega_H$. Thus, when $$\frac{Q_1}{Q_2} \gg \frac{k}{1-k'} \quad (2)$$

the received power is independent of coupling coefficient k, that is, of coil separation or axial misalignment in the wireless power transfer link 230, provided k remains>$k_C$ and the frequency of operation is either $\omega_L(k)$ or $\omega_H(k)$. In practice, k remains<0.5 over the entire range of coil spacing so equation (2) is easily satisfied. Furthermore, equation (1) leads to $$\frac{|V_L|}{|V_S|}(\omega_L, \omega_H) = \sqrt{\frac{L_2}{L_1}}, \quad (3)$$

which does not depend on k or $R_2$.

Wireless power transfer systems in accordance with many embodiments of the invention are robust to coil separation and load variations by utilizing a sinusoidal current drive that automatically tunes to either $\omega_L$ or $\omega_H$ at any viable k, and which holds the voltage amplitude |$V_S$| constant as $R_2$ varies as described by equation (3). In a variety of embodiments, wireless power transfer systems utilize an oscillator circuit with automatic amplitude control (AAC) as described in more detail below. The AC current source $I_S$ can be replaced by a commutated constant current source that provides a differential negative resistance as appropriate to the requirements of specific applications of embodiments of the invention. In many embodiments, the wireless power transfer system 200 will only oscillate at the frequency where the coupled resonators present an impedance of zero phase, i.e. at $\omega_L(k)$ or $\omega_H(k)$, while at $\omega_{res}$ the oscillation may not be sustainable. Because of inevitable small mistuning in the two resonators, the oscillator can select one of the two stable frequencies, thereby allowing the power transmitter 210 and the power receiver 220 to efficiently transfer power over wireless power transfer link 230 at varying distances and/or axial misalignments. In several embodiments, the resonance frequency of the receiver circuit is intentionally designed to be slightly higher than that of the transmitter so that the system is in favor of operating at $\omega_L$. As the coils are placed closer together, the operating frequency departs from resonance and gets "locked" to the lower frequency. In other embodiments, the receiver is designed to lock at the higher frequency.

Although a variety of wireless power transfer circuits are described above with respect to FIGS. 1 and 2, any variety of circuits, including, but not limited to, those that utilize additional components not specifically described above, can be equivalent to those described above in accordance with embodiments of the invention.

Wireless Power Transfer Systems

As described above, wireless power transfer systems in accordance with several embodiments of the invention can self-tune to a frequency for stable power so that the fluctuations in the power delivered can be minimized and the wireless power transfer system can operate at a high efficiency. Power transmitters in accordance with many embodiments of the invention are designed to convert DC power extracted from a power supply efficiently into AC power in a way that does not degrade the quality factor of the power transmitter so that equation (2) is satisfied with a large margin and η in equation (1) remains high.

Figure 3A:
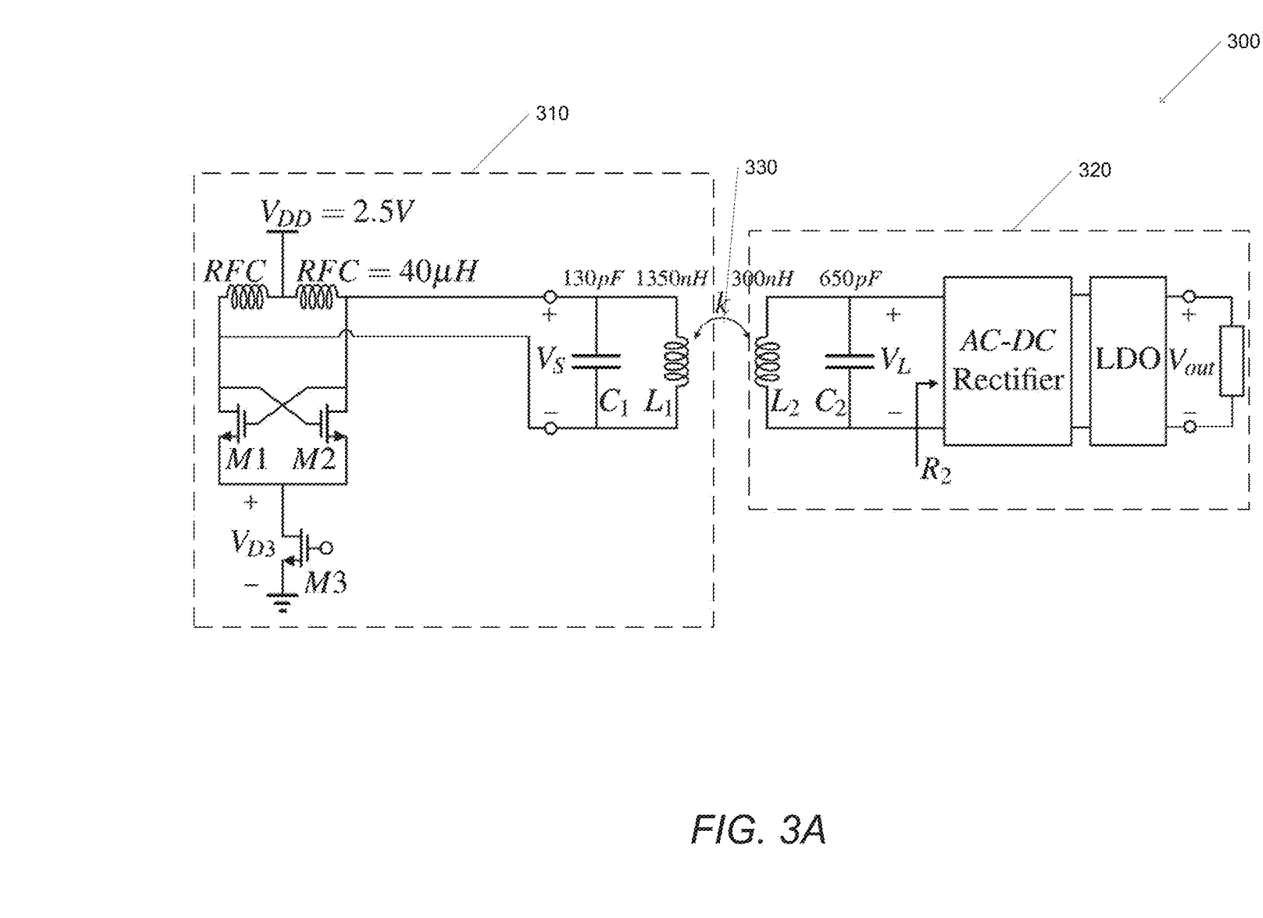
FIG. 3A is a conceptual illustration of a wireless power transfer system in accordance with an embodiment of the invention.

Turning now to FIG. 3A, a wireless power transfer system in accordance with an embodiment of the invention is shown. The wireless power transfer system 300 includes a power transmitter 310 and a power receiver 320 coupled by a wireless power transfer link 330. The power transmitter 310 includes a voltage source VDD electrically coupled to one or more radio frequency chokes (RFCs). The RFCs are electrically coupled to a capacitor $C_1$ and inductor $L_1$ in parallel, which are electrically coupled to transistors $M_1$, $M_2$, and $M_3$. In a variety of embodiments, the transistors are field effect transistors (FETs), although any transistor construction can be utilized as appropriate to the requirements of specific applications of embodiments of the invention. The power receiver 320 includes inductor $L_2$ and capacitor $C_2$ electrically coupled in parallel with an AC-DC rectifier, a low-dropout regulator (LDO), and a resistor $R_2$. In many embodiments, the resistor $R_2$ represents a load device as described above. In several embodiments, $M_1$ and $M_2$ base collector cross coupled. In a number of embodiments, $M_1$ and $M_2$ bias $M_3$ into saturation mode. In many embodiments, operating $M_3$ in saturation cause it to effectively appear as a diode, thereby creating a differential voltage across the pair of inductors RFC in such a way that $M_3$ prevents current to flow through the transistors and all current from the current source flows through $C_1$ and $L_1$.

In several embodiments, the power transmitter can self-tune to a frequency of stable power delivery cycle and achieve high power transfer efficiency by maintaining a voltage below a threshold value across every transistor that carries current. In several embodiments, this is achieved by making the width of transistors wider than a threshold value. Additionally, the power transmitter maintains a large Q factor of the transmitter side $L_1C_1$ tank by controlling the waveform of $V_{D3}$ to be above a threshold value so that transistor $M_3$ (i.e. a tail current source) stays in saturation. Introduction of a tail current source (e.g. $M_3$) can preserve the quality factor of the transmitter side $L_1C_1$ tank, which can improve overall power transfer efficiency. The power consumed by $M_3$ is a function of the current through $M_3$ and the voltage across $M_3$. Since the current through $M_3$ is essentially a DC current, minimizing power losses in $M_3$ involves minimizing the voltage drop across $M_3$. In a number of embodiments, the RFCs have large inductance and act as common mode impedances filter out most of the AC components to achieve a relatively constant voltage across $M_3$. By adjusting the bias voltage applied to $M_3$, the voltage drop across $M_3$ can be set just above the level to make $M_3$ operate in its saturation region. However, any voltage that keeps transistor $M_3$ in saturation can be utilized as appropriate to the requirements of specific applications of embodiments of the invention. In this way, the transistor(s) $M_3$ behave as a current source. In a number of embodiments, the RFCs carry the supply current. Thus, if at zero differential output voltage, transistor $M_3$ can be sized to absorb the supply current while operating in saturation, therefore it will not enter triode over the entire oscillation cycle as the RF chokes resist any change in current.

Figure 5:
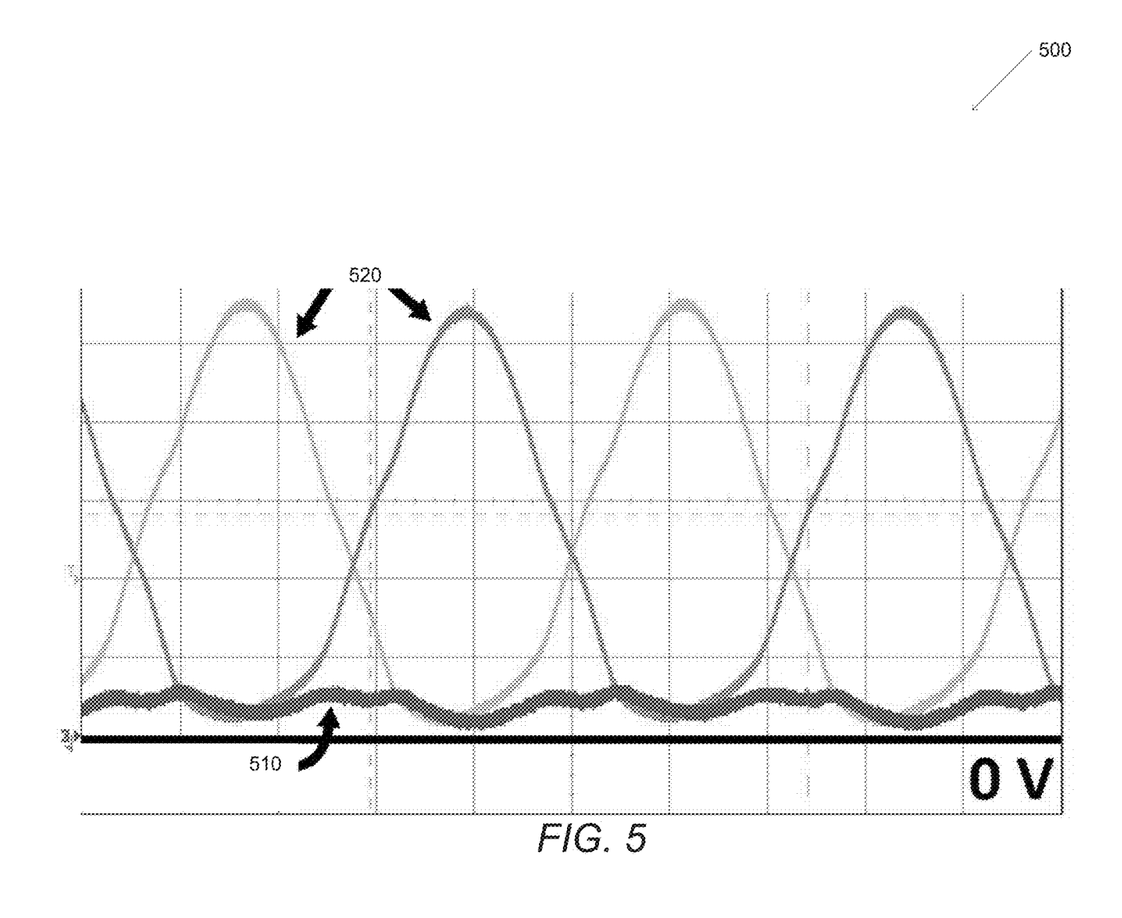
FIG. 5 is a conceptual illustration of typical operating waveforms for a wireless power transfer system in accordance with an embodiment of the invention.

Turning now to FIG. 5, a conceptual illustration of the operating voltages of the wireless power transfer system 300 is shown. A small 2nd harmonic ripple 510 on $V_{D3}$ accounts for single-ended oscillator voltages, while the differential voltage 520 is an almost perfect sinusoid similar to a class D waveform. In many embodiments, the low bias $V_{D3}$=0.3V improves the power transmitter's power conversion efficiency.

Figure 3B:
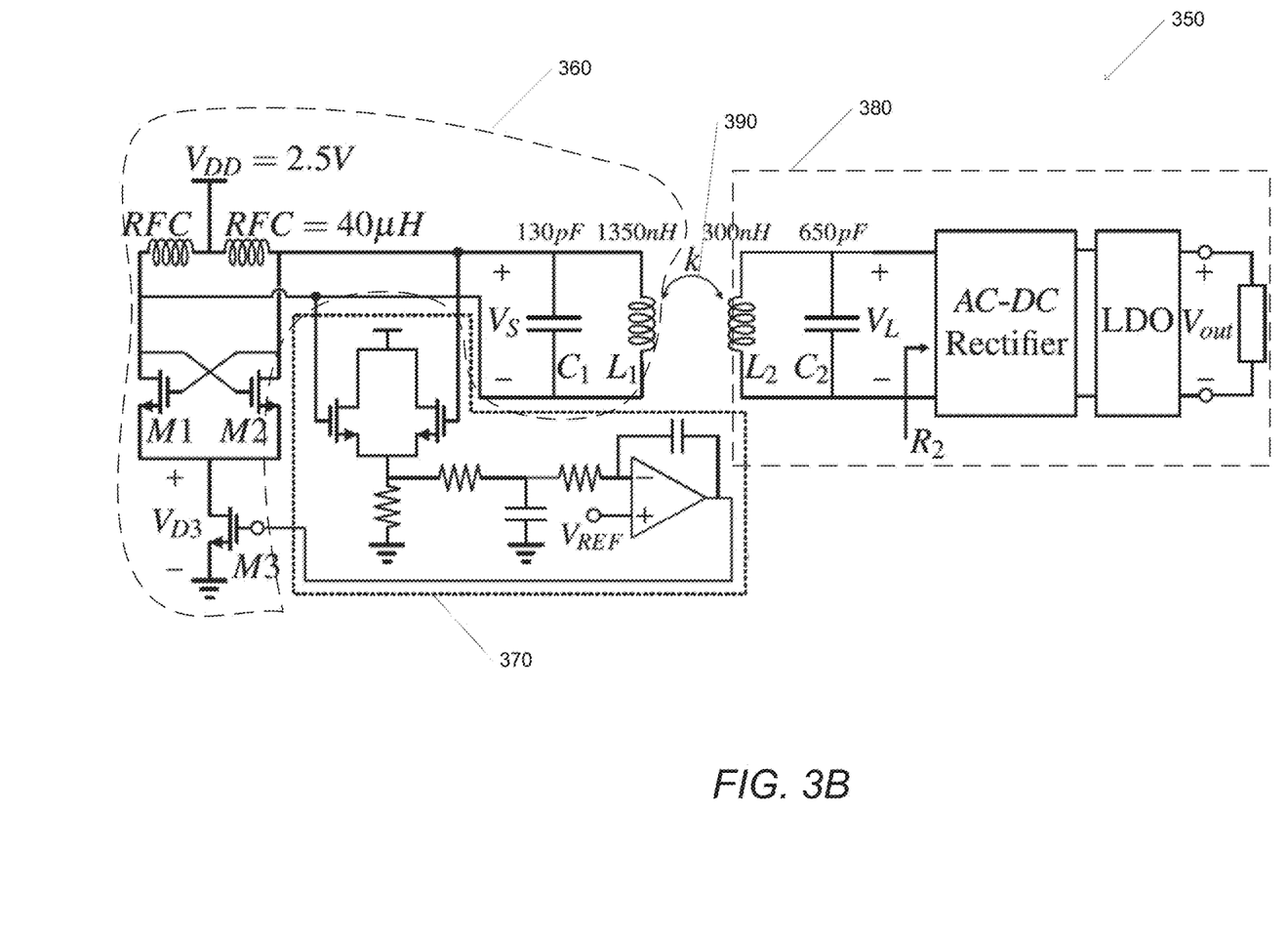
FIG. 3B is a conceptual illustration of a wireless power transfer system having an automatic amplitude controller in accordance with an embodiment of the invention.

Turning now to FIG. 3B, a wireless power transfer system having with automatic amplitude controller (AAC) is shown. The wireless power transfer system 350 includes a power transmitter 360 magnetically or electrically coupled to a power receiver 380 via a wireless power transfer link 390 similar to those described above. The power transmitter 360 further includes the AAC 370 electrically coupled to the power transmitter 360 as illustrated in FIG. 3B. AAC 370 includes two transistors electrically coupled to a voltage source and further coupled to a set of resistors, capacitors, and an op amp. However, AAC 370 can be composed of an amplitude detector, mechanisms to compare the detected amplitude with a reference voltage, and a feedback to tell the power transmitter 360 to maintain a constant oscillation amplitude as appropriate to the requirements of specific applications of embodiments of the invention. In several embodiments, the AAC 370 makes the power transmitter appear as a voltage source of constant amplitude $|V_S|$ but with variable frequency. In a variety of embodiments, the variable frequency is between 10.4 MHz and 13.56 MHz, although any frequency range can be utilized in accordance with the requirements of specific applications of embodiments of the invention.

Figure 4:
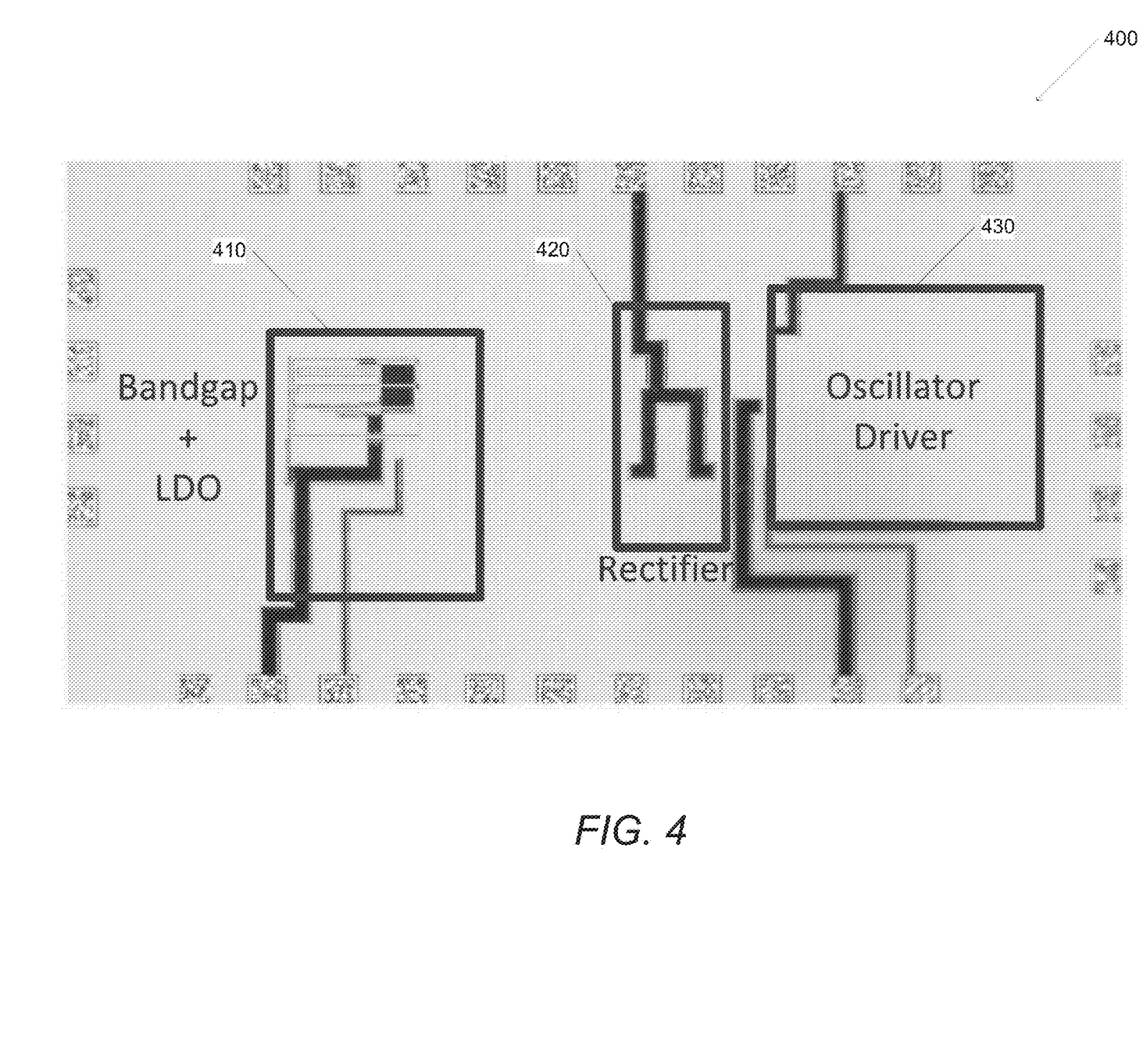
FIG. 4 is a conceptual illustration of a wireless power transfer system fabricated on a microchip in accordance with an embodiment of the invention.

Turning now to FIG. 4, an embodiment of a power receiver fabricated on a microchip in accordance with an embodiment of the invention is shown. The microchip 400 includes an oscillator driver 430 and receiver power management system including a rectifier 420 and a low-dropout regulator (LDO) 420. Any of a variety of lithographic processes, including 0.18-μm CMOS processes, can be utilized to fabricate the microchip as appropriate to the requirements of specific applications of embodiments of the invention. Although the microchip 400 is fabricated onto a single chip, many embodiments of the invention can utilize multi-chip implementations.

Although a variety of wireless power transfer systems are described above with respect to FIGS. 3A, 3B, and 4, any variety of circuits, including those that utilize components with different performance characteristics than those illustrated, additional components not specifically described above, and those that operate at different voltages and/or different frequencies, can be utilized in accordance with embodiments of the invention.

Operation of Wireless Power Transfer Systems

Figure 6A:
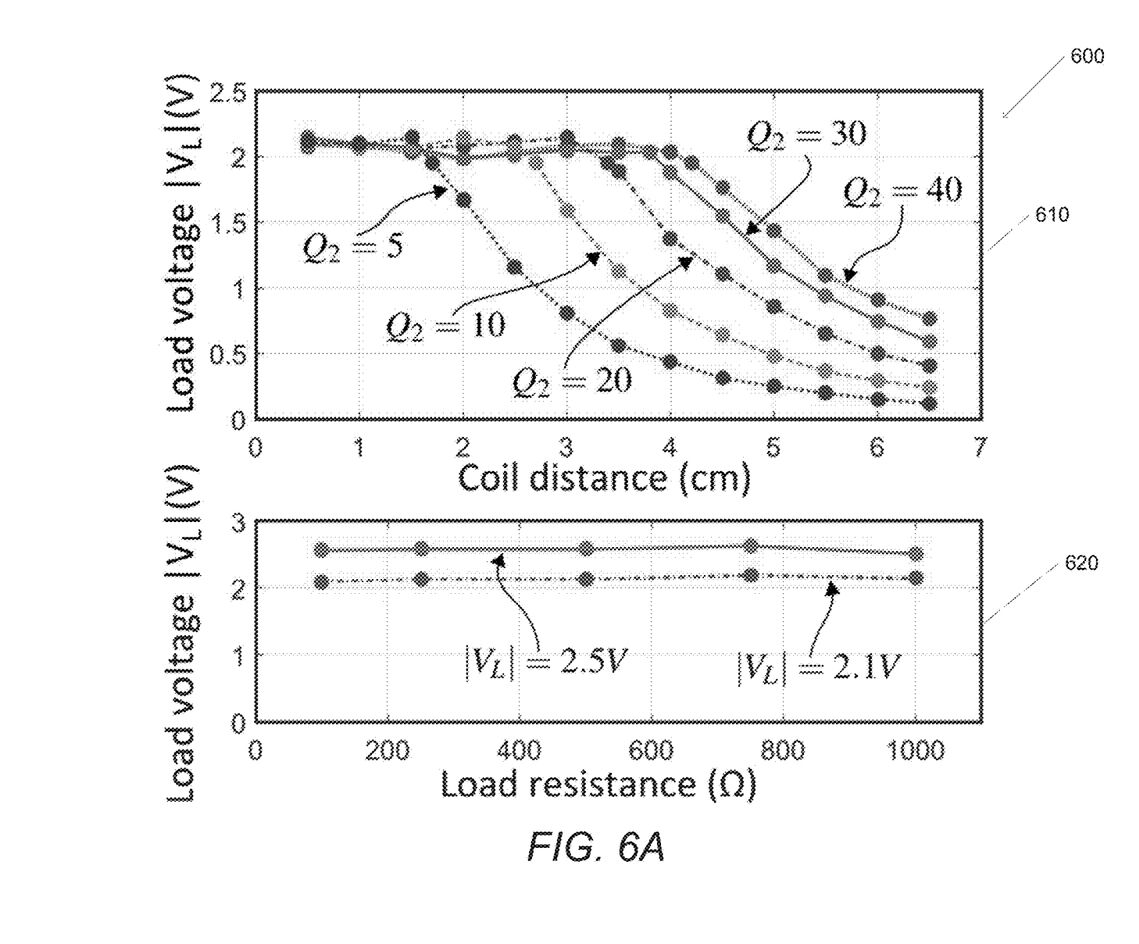
FIGS. 6A-B are conceptual illustrations of the power delivery of a wireless power system in accordance with embodiments of the invention.
Figure 6B:
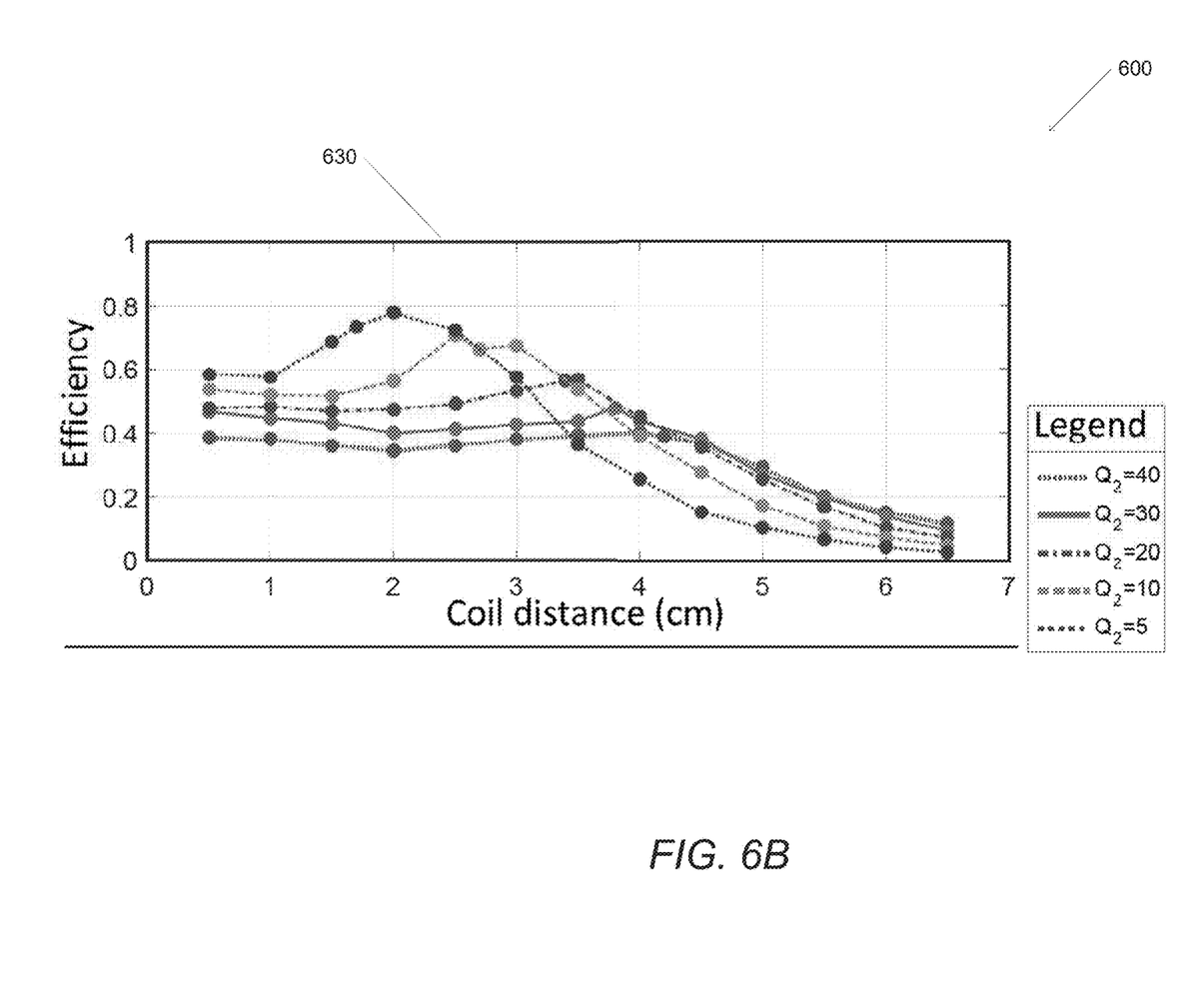

Having described the construction and function of wireless power transfer systems, it is beneficial to analyze the performance of the system. Turning now to FIG. 6, the performance of a wireless power transfer system in accordance with an embodiment of the invention is shown. In the illustrated embodiment, inductor coils of 3 cm diameter were utilized, realizing $L_1$ with 5 turns of 20 AWG copper wire and $L_2$ with 2 turns with a target power delivery of 18 mW. At 12 MHz, their measured unloaded quality factors are 180 and 130 respectively. The power transmitter and power receiver are tuned to roughly equal $\omega_{res}$ with discrete capacitors. The system was tested when loaded with resistors and with a load device. Performance graphs 600 illustrate how the wireless power transfer link self-regulates $|V_L|$ as the distance between the inductor coils in the power transmitter and power receiver change, across different loads $R_2$ indicated on graph 610 by the range of $Q_2$. As expected from the equations described above, the lower the $k_C=1/Q_2$, the larger the range of coil separation or axial misalignment over which $|V_L|$ is regulated. Power is still delivered to the load device beyond this range, but at a lower voltage. Graph 620 also shows that at a fixed coil separation, the received voltage is well-regulated over changes in load of as large as 10×. Turning now to FIG. 6B, graph 630 illustrates the efficiency of the wireless power transfer system over varying wireless power link distances for a set of quality factors for the power receiver.

Figure 7A:
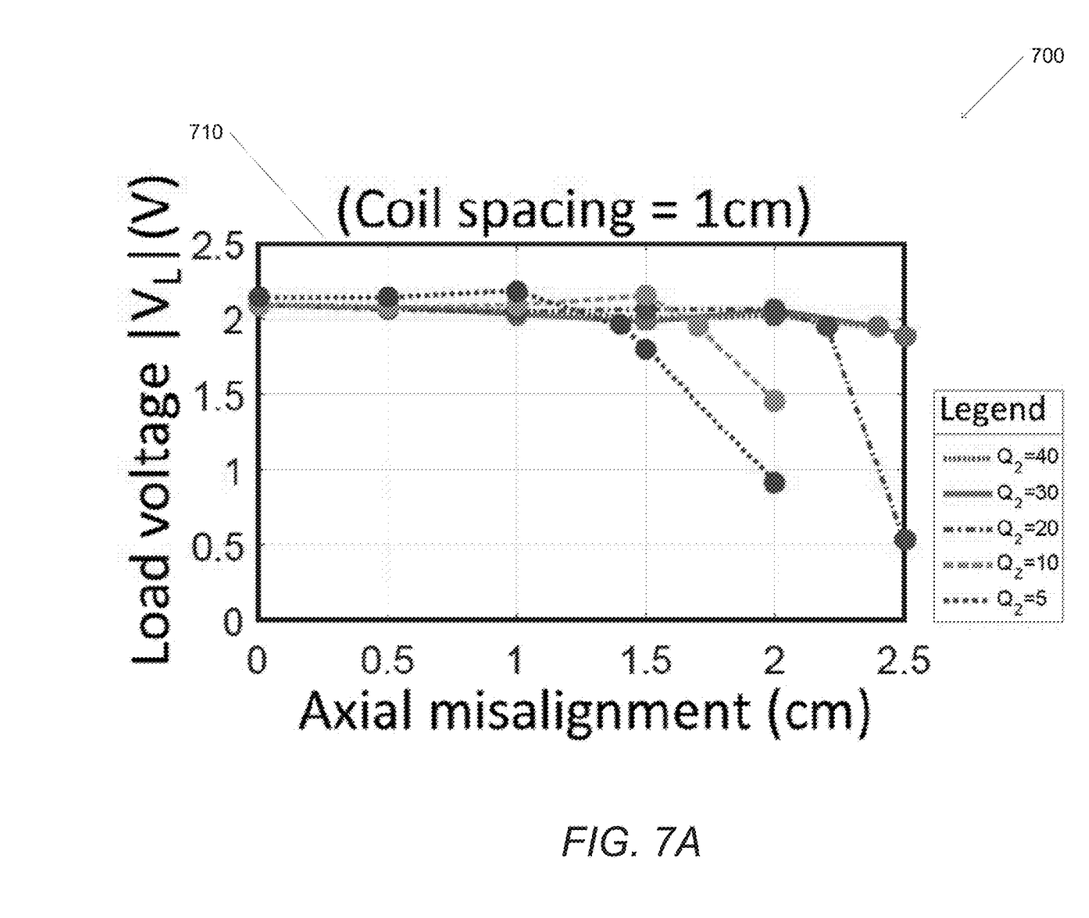
FIGS. 7A-B are conceptual illustrations of the power delivery of a wireless power transfer system with an axial misalignment in accordance with embodiments of the invention.
Figure 7B:
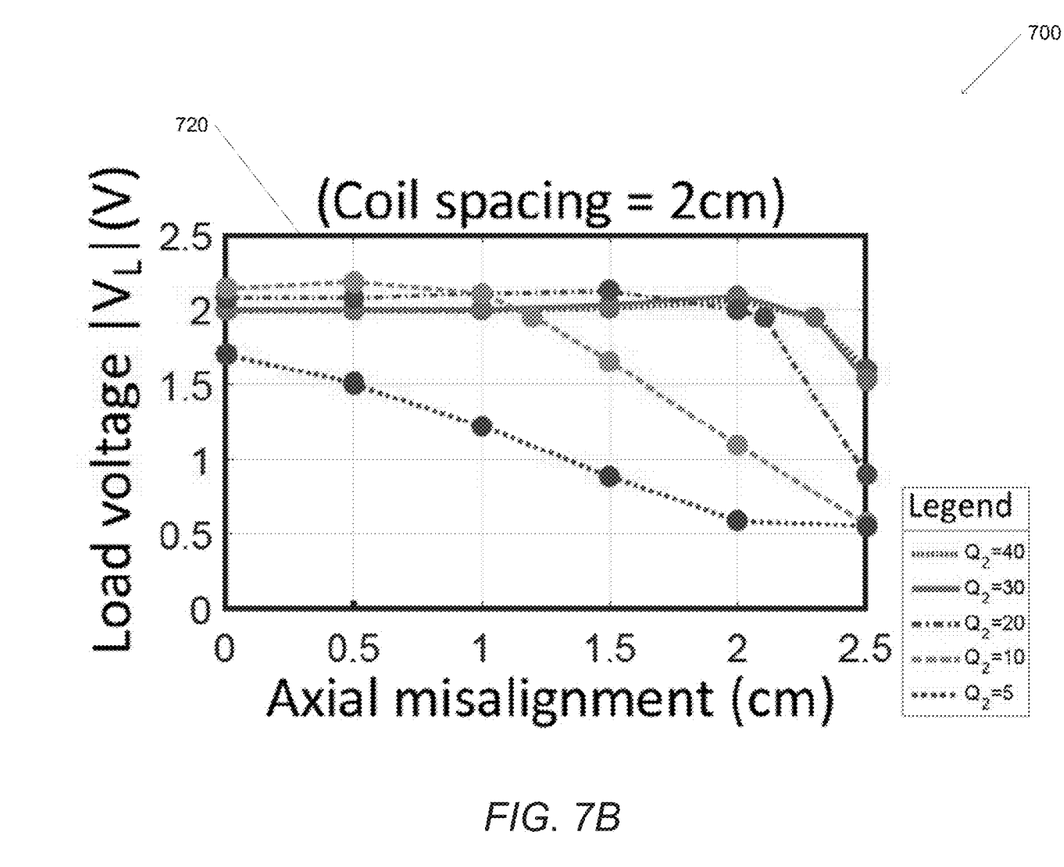

Turning now to FIGS. 7A-B, graphs 700 illustrate the performance of the wireless power transfer system over a variety of axial misalignments and wireless power link distances (e.g. coil spacing). Graph 710 illustrates the load voltages $|V_L|$ for a wireless power transfer link having a distance of 1 cm for a variety of quality factors for the power receiver, while Graph 720 illustrates the load voltages $|V_L|$ for a wireless power transfer link having a distance of 2 cm for a variety of quality factors for the power receiver.

Although FIGS. 6 and 7A-C illustrate the performance of a wireless power transfer system having a particular configuration and target power, operation at a wide variety of voltages and loads is possible as appropriate to the requirements of specific applications of embodiments of the invention. For a load device requiring power $$\propto \frac{|V_L|^2}{R_2},$$

this power can be achieved by increasing $V_L$. In this instance, $V_S$ may or may not to be increased. This can be adjusted by changing the inductance ratio $$\frac{|V_L|}{|V_S|}(\omega_L, \omega_H) = \sqrt{\frac{L_2}{L_1}}$$

This power can also be achieved by decreasing $R_2$. In this instance, in order to maintain a good loaded $Q_2$ with reduced $R_2$, coil inductance or operating frequency needs to be lower:

$$Q = \frac{R_2}{\omega L_2}$$

By way of example, to deliver 1 W to the load device:

$$V_{out} = 5 \text{ V}, I_{out} = 0.2 \text{ A} \rightarrow R_L = 25\Omega$$

$$R_2 \approx 100\Omega, |V_L| = 15 \text{ V}$$

$$f_{res} = 1 \text{ MHz}, L_2 \sim 500 \text{ nH} \rightarrow Q_2 \approx 25$$

$$\frac{L_2}{L_1} = 1 \rightarrow V_{DD} \sim 7.5 \text{ V} \rightarrow |V_S| \sim 15 \text{ V}$$

Although the present invention has been described in certain specific aspects, many additional modifications and variations would be apparent to those skilled in the art. In particular, any of the various processes described above can be performed in alternative sequences and/or in parallel (on the same or on different devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the person skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled person, except where expressly required. Accordingly, the scope of the invention should be determined not by the embodiments illustrated, but by the appended claims and their equivalents.

What is claimed is:

1. A wireless power transfer system, comprising:
   a power transmitter driven by an oscillator;
   a power receiver comprising a resistive load; and
   a coupled resonator link configured to deliver power from a transmitter tank circuit to a receiver tank circuit;
   wherein the free-running oscillator automatically tunes to oscillate at a frequency that does not experience a phase shift due to the impedance of the transmit side of the coupled resonator link;
   wherein the power transmitter provides regulated voltage across a range of distances between the transmitter tank circuit and the receiver tank circuit;
   wherein the power transmitter regulates voltage across a range of resistive loads of the power receiver;
   wherein quality factor for the transmitter tank circuit exceeds the quality factor for the receiver tank circuit;
   wherein the oscillator driver is configured to minimize energy loss in the transmitter tank circuit; and
   wherein the oscillator driver is configured with a tail current source that blocks a discharging path.

2. The wireless power transfer system of claim 1, wherein the tail current source comprises a transistor having a drain voltage that is maintained above a threshold voltage during operation.

3. The wireless power transfer system of claim 2, wherein the transistor at the tail current source remains in a saturation region of the transistor.

4. The wireless power transfer system of claim 1, wherein the tail current source is controlled by a feedback loop that maintains the oscillation amplitude at a reference level over a range of resistive loads.

5. The wireless power transfer system of claim 1, wherein the wireless power transfer regulates load voltage across a range of coil separations.

6. The wireless power transfer system of claim 5, wherein the wireless power transfer system regulates the load voltage across a range of resistive loads.

* * * * *